US012695227B2

(12) United States Patent
Hashiguchi

(10) Patent No.: US 12,695,227 B2
(45) Date of Patent: Jul. 28, 2026

(54) CONNECTOR

(71) Applicant: Japan Aviation Electronics Industry, Limited, Tokyo (JP)

(72) Inventor: Osamu Hashiguchi, Tokyo (JP)

(73) Assignee: Japan Aviation Electronics Industry, Limited, Tokyo (JP)

( * ) Notice: Subject to any disclaimer, the term of this patent is extended or adjusted under 35 U.S.C. 154(b) by 311 days.

(21) Appl. No.: 18/222,654

(22) Filed: Jul. 17, 2023

(65) Prior Publication Data

US 2024/0079809 A1 Mar. 7, 2024

(30) Foreign Application Priority Data

Sep. 1, 2022 (JP) ................................. 2022-139302

(51) Int. Cl.
*H01R 12/77* (2011.01)
*H01R 33/76* (2006.01)

(52) U.S. Cl.
CPC ......... *H01R 12/778* (2013.01); *H01R 12/771* (2013.01); *H01R 12/772* (2013.01); *H01R 12/777* (2013.01); *H01R 33/7642* (2013.01); *H01R 2201/00* (2013.01)

(58) Field of Classification Search
None
See application file for complete search history.

(56) References Cited

U.S. PATENT DOCUMENTS 11,177,597 B2 * 11/2021 Hashiguchi .......... H01R 12/592
11,258,189 B2 * 2/2022 Hashiguchi .......... H01R 13/502
2018/0233854 A1 8/2018 Komoto et al.
2021/0104824 A1 4/2021 Hashiguchi et al.
2024/0072481 A1 * 2/2024 Komoto ............. H01R 12/7011
2024/0222893 A1 * 7/2024 Hashiguchi ............ H01R 13/05

FOREIGN PATENT DOCUMENTS

| | | | |
|---|---|---|---|
| EP | 3767753 | A1 | 1/2021 |
| EP | 3800739 | A1 | 4/2021 |
| JP | 2018129244 | A | 8/2018 |
| JP | 2021-061225 | A | 4/2021 |

OTHER PUBLICATIONS

A Search Report in corresponding European Application No. 23186205.3 mailed Jan. 15, 2024 is attached, 8 pages.

* cited by examiner

*Primary Examiner* — Felix O Figueroa
(74) *Attorney, Agent, or Firm* — MUNCY, GEISSLER, OLDS & LOWE, P.C.

(57) ABSTRACT

A connector includes a tubular plug contact and an inner contact. The plug contact has a recessed portion extending along a fitting axis, and the inner contact is constituted of a projection that is inserted in the recessed portion and has an outer peripheral surface covered with a conductive layer. The inner contact has a contacting portion contacting the plug contact within the recessed portion and a pressing portion situated in a rotational position different from the contacting portion about the fitting axis. A part of a sheet type connection object having a flexible conductor is sandwiched between the pressing portion and an inner surface of the recessed portion in a direction perpendicular to the fitting axis.

7 Claims, 12 Drawing Sheets

CONNECTOR

BACKGROUND OF THE INVENTION

The present invention relates to a connector, particularly to a connector connected to a sheet type connection object having a flexible conductor exposed on at least one surface of the connection object.

In recent years, attention has been drawn to so-called smart clothes that can obtain user's biological data such as the heart rate and the body temperature only by being worn by the user. Such smart clothes have an electrode disposed at a measurement site, and when a wearable device serving as a measurement device is electrically connected to the electrode, biological data can be transmitted to the wearable device.

The electrode and the wearable device can be interconnected by, for instance, use of a connector connected to a flexible conductor drawn from the electrode.

As a connector of this type, for example, JP 2018-129244 A discloses a connector as illustrated in FIG. 21. The connector includes a housing 2 and a base member 3 that are disposed on the opposite sides of a flexible substrate 1 to sandwich the flexible substrate 1 therebetween. Tubular portions 4A of contacts 4 are passed through contact through-holes 2A of the housing 2, and flanges 4B of the contacts 4 are sandwiched between the housing 2 and flexible conductors 1A exposed on the top surface of the flexible substrate 1.

In this state, when the base member 3 is pushed toward the housing 2, as shown in FIG. 22, a projection 3A of the base member 3 is inserted into a projection accommodating portion 4C of the contact 4 with the flexible substrate 1 being sandwiched therebetween, and the inner surface of the projection accommodating portion 4C makes contact with the flexible conductor 1A with a predetermined contact force, whereby the contact 4 is electrically connected to the flexible conductor 1A.

Further, housing fixing posts 3B formed to project from the base member 3 are press-fitted into post accommodating portions 2B of the housing 2 as shown in FIG. 21, so that the housing 2 and the base member 3 are fixed to each other.

When fitted to the connector disclosed in JP 2018-129244 A, a wearable device can be connected to electrodes constituted of the flexible conductors.

However, when the flexible conductors 1A are exposed on the bottom surface of the flexible substrate 1, the connector of JP 2018-129244 A would be useless in electrically connecting the flexible conductors 1A with the contacts 4.

SUMMARY OF THE INVENTION

The present invention has been made to solve the foregoing problem and aims at providing a connector that can electrically connecting a contact to a flexible conductor of a connection object regardless of whether the flexible conductor is exposed on the top surface or the bottom surface of the connection object.

A connector according to the present invention comprises:

a plug contact having a conductive property, having a tubular shape, and including a recessed portion extending along a fitting axis; and an inner contact constituted of a projection that is inserted in the recessed portion and has an outer peripheral surface covered with a conductive layer, wherein the inner contact has a contacting portion making contact with the plug contact within the recessed portion and a pressing portion situated in a rotational position different from the contacting portion about the fitting axis, and a part of a connection object of sheet type having a flexible conductor exposed on at least one surface of the connection object is sandwiched between the pressing portion and an inner surface of the recessed portion in a direction perpendicular to the fitting axis, the inner surface of the recessed portion makes contact with a top surface of the connection object, and the pressing portion makes contact with a bottom surface of the connection object, whereby the plug contact is electrically connected to the flexible conductor directly when the flexible conductor is exposed on the top surface of the connection object, and the plug contact is electrically connected to the flexible conductor via the inner contact when the flexible conductor is exposed on the bottom surface of the connection object.

DETAILED DESCRIPTION OF THE INVENTION

Embodiments of this invention are described below based on the appended drawings.

Embodiment 1

Figure 1:
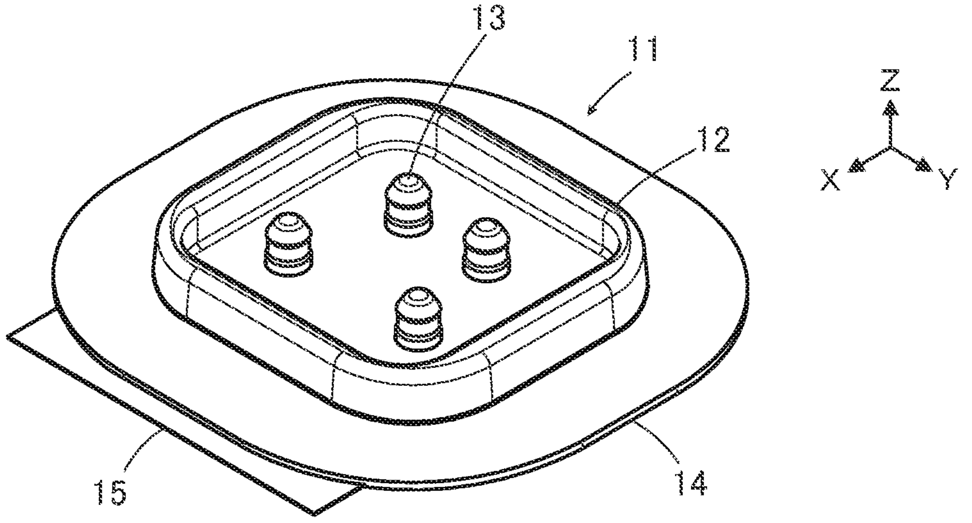
FIG. 1 is a perspective view showing a connector according to Embodiment 1.

FIG. 1 shows a connector 11 according to Embodiment 1. The connector 11 is, for instance, used as a garment-side connector for fitting a wearable device and has a housing 12 made of an insulating material. Four plug contacts 13 are retained in the housing 12, and a reinforcement sheet 14 and a sheet type conductive member 15 being superposed on each other are retained by the housing 12. The sheet type conductive member 15 constitutes a connection object to which the connector 11 is connected.

The four plug contacts 13 are arranged in two rows parallel to each other and disposed to project perpendicularly to the sheet type conductive member 15.

For convenience, the reinforcement sheet 14 and the sheet type conductive member 15 are defined as extending in an XY plane, the arrangement direction of the four plug contacts 13 is referred to as "Y direction," and the direction in which the four plug contacts 13 project is referred to as "+Z direction." The Z direction is a fitting direction in which the connector 11 is fitted to a counter connector.

Figure 2:
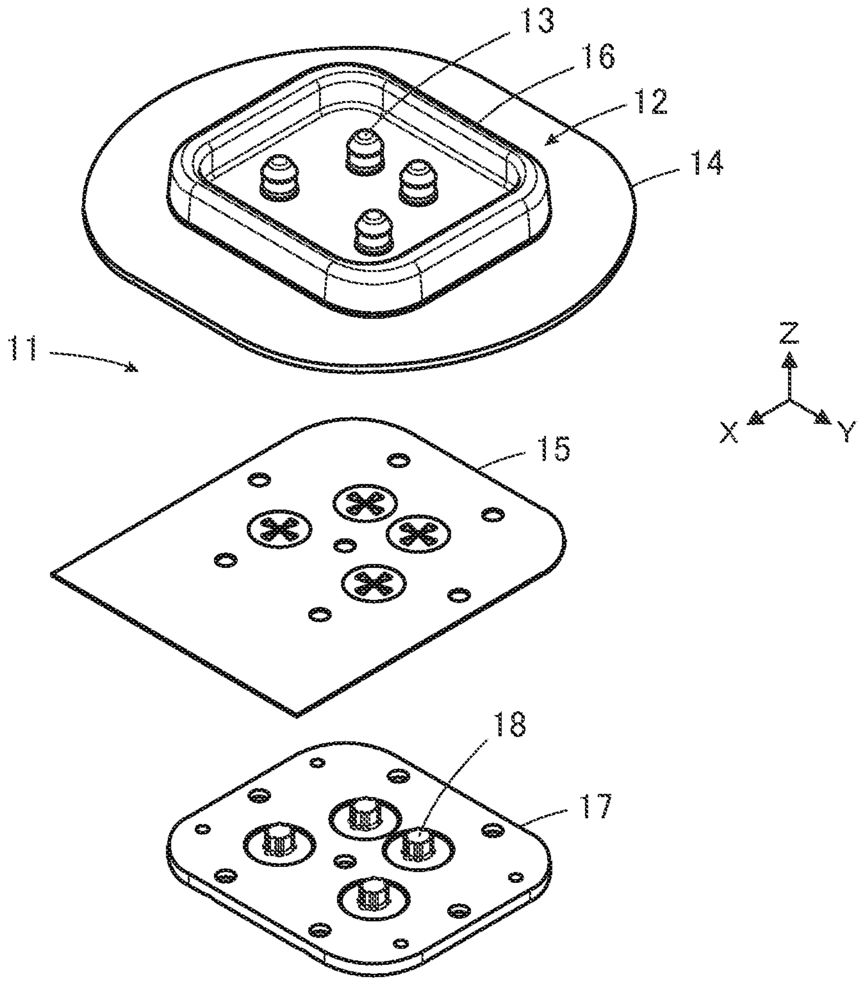
FIG. 2 is an exploded perspective view of the connector according to Embodiment 1 as viewed from an obliquely upper position.
Figure 3:
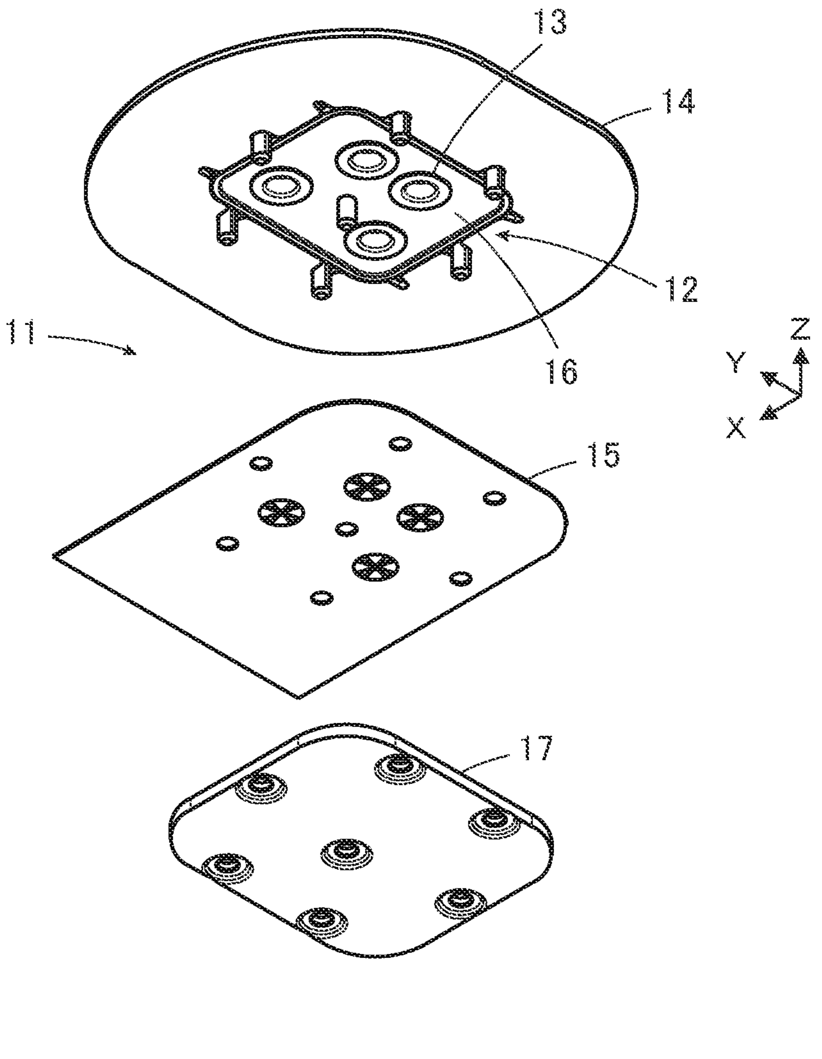
FIG. 3 is an exploded perspective view of the connector according to Embodiment 1 as viewed from an obliquely lower position.

FIGS. 2 and 3 show exploded perspective views of the connector 11. The connector 11 includes a top insulator 16 and a bottom insulator 17, and these top and bottom insulators 16 and 17 constitute the housing 12.

The four plug contacts 13 are retained in the top insulator 16. The reinforcement sheet 14 is disposed on the bottom surface of the top insulator 16 on the −Z direction side, and the sheet type conductive member 15 is disposed on the −Z direction side of the reinforcement sheet 14. Further, the bottom insulator 17 is disposed on the −Z direction side of the sheet type conductive member 15. The bottom insulator 17 is provided with four inner contacts 18. The four inner contacts 18 separately correspond to the four plug contacts 13.

Figure 4:
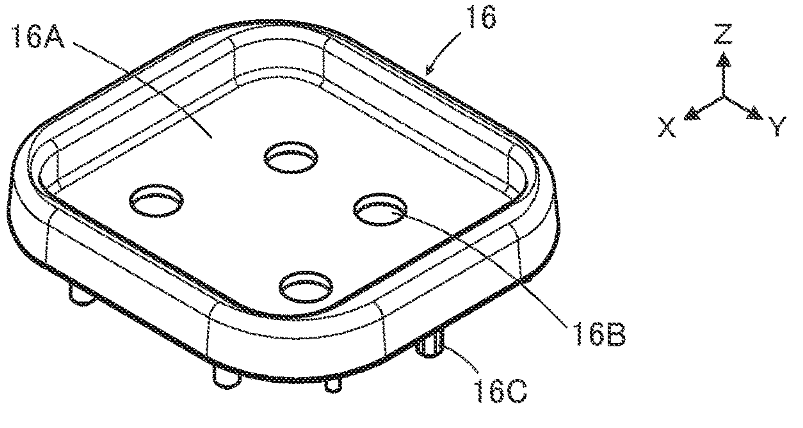
FIG. 4 is a perspective view showing a top insulator used in the connector of Embodiment 1.

As shown in FIG. 4, the top insulator 16 includes a recessed portion 16A opening in the +Z direction and four contact through-holes 16B formed within the recessed portion 16A. The recessed portion 16A constitutes a counter connector accommodating portion in which a part of a counter connector (not shown) is to be accommodated, and the four contact through-holes 16B correspond to the four plug contacts 13. On a surface of the top insulator 16 facing the −Z direction, a plurality of bosses 16C are formed to project in the −Z direction.

Figure 5:
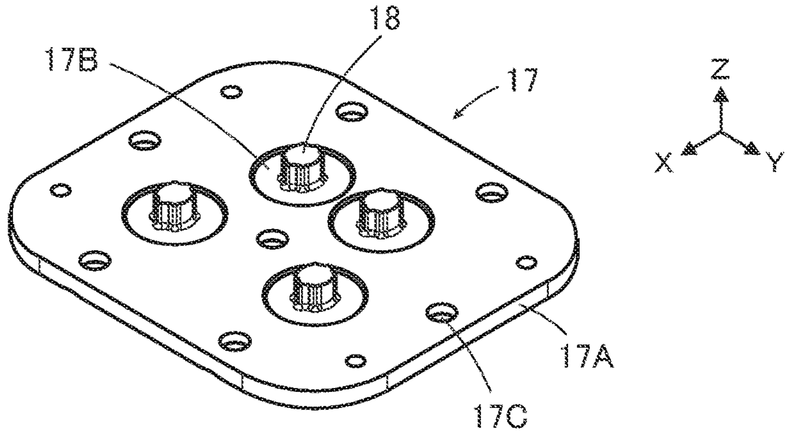
FIG. 5 is a perspective view showing a bottom insulator used in the connector of Embodiment 1.

As shown in FIG. 5, the bottom insulator 17 includes a flat plate portion 17A, and the flat plate portion 17A is provided with four circular recessed portions 17B opening in the +Z direction. The four recessed portions 17B correspond to the four plug contacts 13. The four recessed portions 17B are each provided with an inner contact 18.

Further, the flat plate portion 17A is provided with a plurality of through-holes 17C corresponding to the bosses 16C of the top insulator 16.

Figure 6:
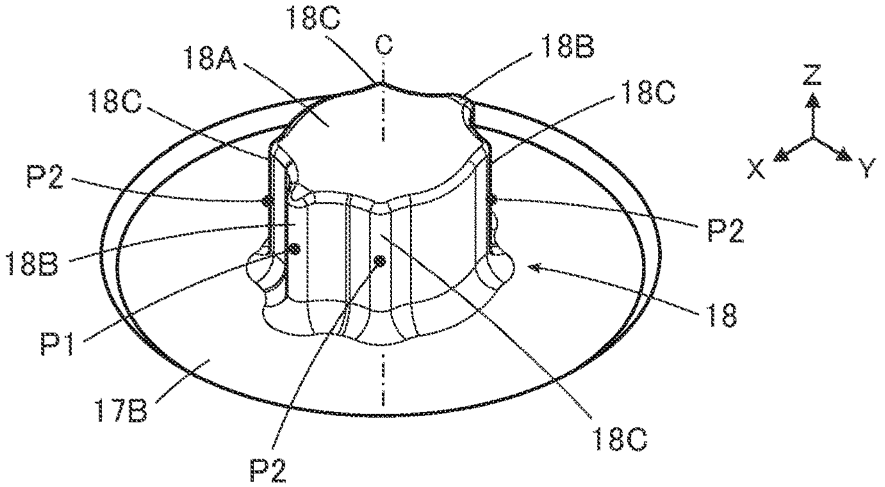
FIG. 6 is a perspective view showing an inner contact used in the connector of Embodiment 1.

As shown in FIG. 6, the inner contact 18 is formed from a projection 18A whose outer peripheral surface is entirely covered with a conductive layer, the projection 18A being made of the insulating material constituting the bottom insulator 17. That is, the projection 18A projects from the recessed portion 17B in the +Z direction along a fitting axis C, and the lateral surface of the projection 18A surrounding the fitting axis C and the top surface thereof facing the +Z direction are entirely covered with a continuous conductive layer.

The conductive layer can be formed by subjecting the outer peripheral surface of the projection 18A of the bottom insulator 17 made of the insulating material to, for instance, electroless plating.

The lateral surface of the projection 18A is provided with: two first protrusion portions 18B disposed on the opposite sides in the X direction across the fitting axis C; and four second protrusion portions 18C disposed at 90-degree intervals about the fitting axis C and each spaced from an adjacent first protrusion portion 18B at a 45-degree interval about the fitting axis C.

Figure 7:
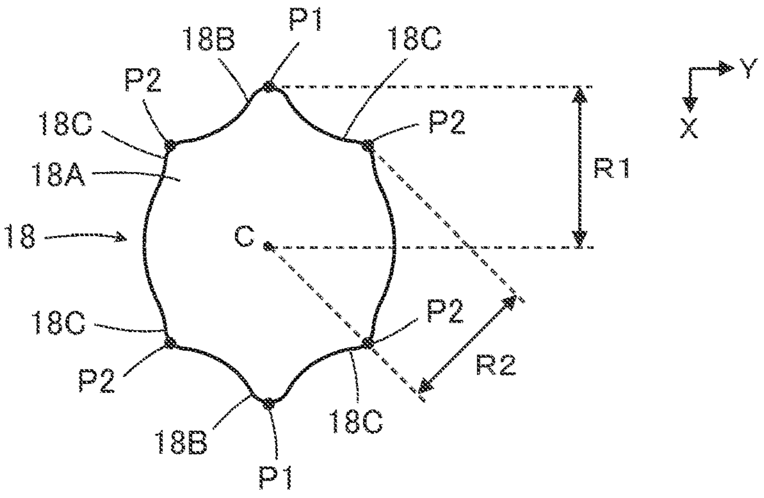
FIG. 7 is a plan view showing the inner contact used in the connector of Embodiment 1.

As shown in FIG. 7, the two first protrusion portions 18B protrude separately in the +X direction and in the −X direction. The four second protrusion portions 18C protrude separately in a direction inclined 45 degrees from the +X direction toward the +Y direction, a direction inclined 45 degrees from the +X direction toward the −Y direction, a direction inclined 45 degrees from the −X direction toward the +Y direction, and a direction inclined 45 degrees from the −X direction toward the −Y direction.

The two first protrusion portions 18B are disposed at the same distance from the fitting axis C, and likewise, the four second protrusion portions 18C are disposed at the same distance from the fitting axis C.

In an XY plane, a first distance R1 from the fitting axis C to the tip of each first protrusion portion 18B is set larger than a second distance R2 from the fitting axis C to the tip of each second protrusion portion 18C.

The tips of the two first protrusion portions 18B and the tips of the four second protrusion portions 18C are covered with the conductive layer covering the outer peripheral surface of the projection 18A. The conductive layer covering the tips of the two first protrusion portions 18B forms two contacting portions P1, and the conductive layer covering the tips of the four second protrusion portions 18C forms four pressing portions P2.

The four plug contacts 13 are made of a conductive material such as metal, and are to be connected to corresponding contacts of a counter connector (not shown) when a part of the counter connector is accommodated in the recessed portion 16A of the top insulator 16.

Figure 8:
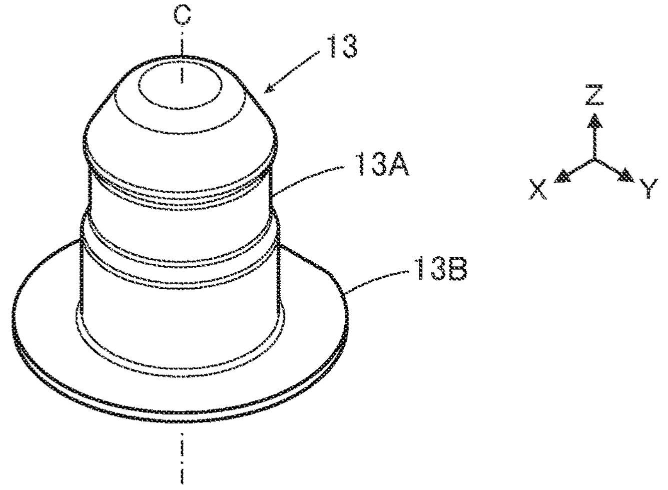
FIG. 8 is a perspective view showing a plug contact used in the connector of Embodiment 1.
Figure 9:
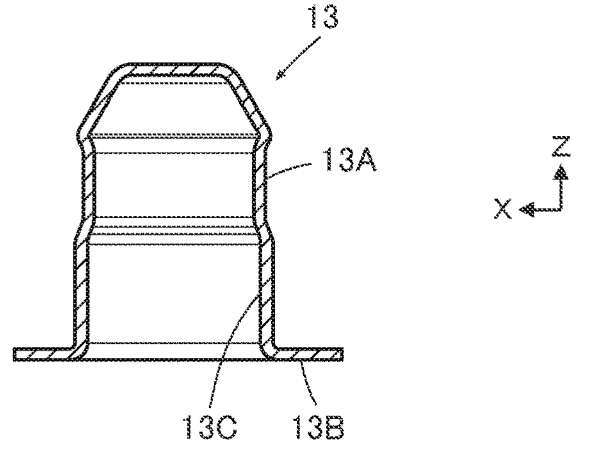
FIG. 9 is a cross-sectional view showing the plug contact used in the connector of Embodiment 1.

As shown in FIG. 8, The plug contact 13 has a tubular portion 13A in the shape of a cylindrical tube extending in the Z direction along the fitting axis C and a flange 13B extending along an XY plane from the −Z directional end of the tubular portion 13A. As shown in FIG. 9, the tubular portion 13A is provided in its interior with a recessed portion 13C opening toward the −Z direction.

The fitting axis C is an axis passing through the center of the tubular portion 13A and extending in the direction in which the connector 11 and a counter connector are fitted to each other.

While the tubular portion 13A has the shape of a cylindrical tube, the cross section thereof is not limited to a circle and may be any of various shapes such as an ellipse and a polygon as long as the tubular portion 13A has the recessed portion 13C in its interior.

The four plug contacts 13 can be each used as a terminal for transmitting electric signals.

The sheet type conductive member 15 has a multilayer structure in which a plurality of wiring layers each formed of a flexible conductor and a plurality of insulating layers are laminated.

Figure 10:
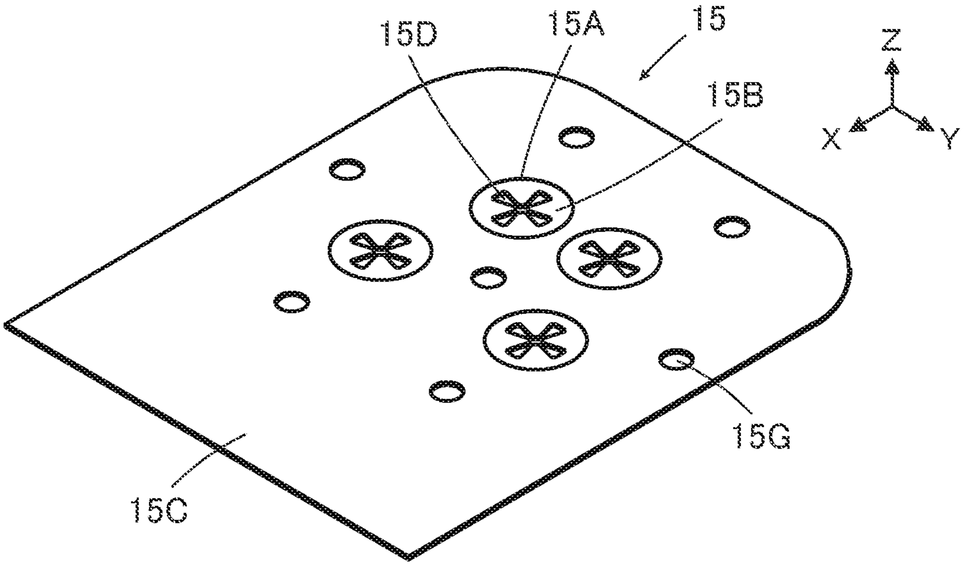
FIG. 10 is a perspective view of a connection object to be connected to the connector of Embodiment 1, as viewed from an obliquely upper position.

As shown in FIG. 10, four contact arrangement regions 15A used to arrange the four plug contacts 13 are defined on the top surface, facing the +Z direction, of the sheet type conductive member 15. A wiring layer 15B is exposed toward the +Z direction in each of the four contact arrangement regions 15A, while an insulating layer 15C is exposed in a region other than the four contact arrangement regions 15A.

The sheet type conductive member 15 is provided with four cross-shaped cuts 15D formed separately in the four contact arrangement regions 15A and penetrating the sheet type conductive member 15 in the Z direction. Each cut 15D is arranged such that the lines of the cross extend in the X direction and the Y direction. Since the cuts 15D penetrate the sheet type conductive member 15 in the Z direction, the cuts 15D are seen also on the bottom surface, facing the −Z direction, of the sheet type conductive member 15 in the positions corresponding to the four contact arrangement regions 15A as shown in FIG. 11.

On the bottom surface, facing the −Z direction, of the sheet type conductive member 15, a wiring layer 15E is exposed toward the −Z direction in the positions corresponding to the four contact arrangement regions 15A, while an insulating layer 15F is exposed in a region other than the regions corresponding to the four contact arrangement regions 15A.

Figure 11:
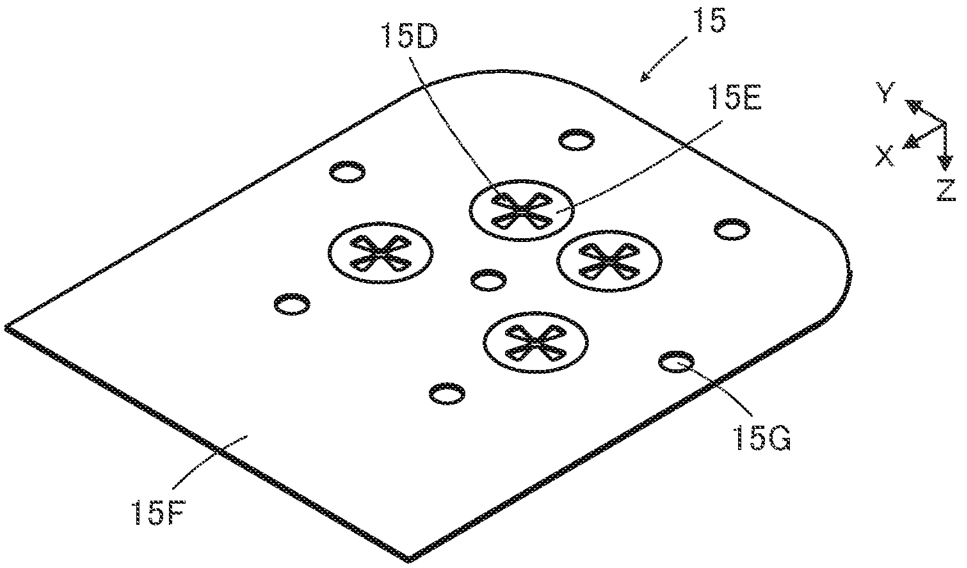
FIG. 11 is a perspective view of the connection object to be connected to the connector of Embodiment 1, as viewed from an obliquely lower position.

Further, the sheet type conductive member 15 is provided at its peripheral portion with a plurality of through-holes 15G corresponding to the bosses 16C of the top insulator 16 as shown in FIGS. 10 and 11.

The first distance R1 from the fitting axis C of the inner contact 18 to the tip of each first protrusion portion 18B as shown in FIG. 7 is set slightly larger than the radius of the recessed portion 13C of the plug contact 13, and the second distance R2 from the fitting axis C of the inner contact 18 to the tip of each second protrusion portion 18C is set slightly larger than the value obtained by subtracting the thickness of the sheet type conductive member 15 from the radius of the recessed portion 13C of the plug contact 13.

Figure 12:
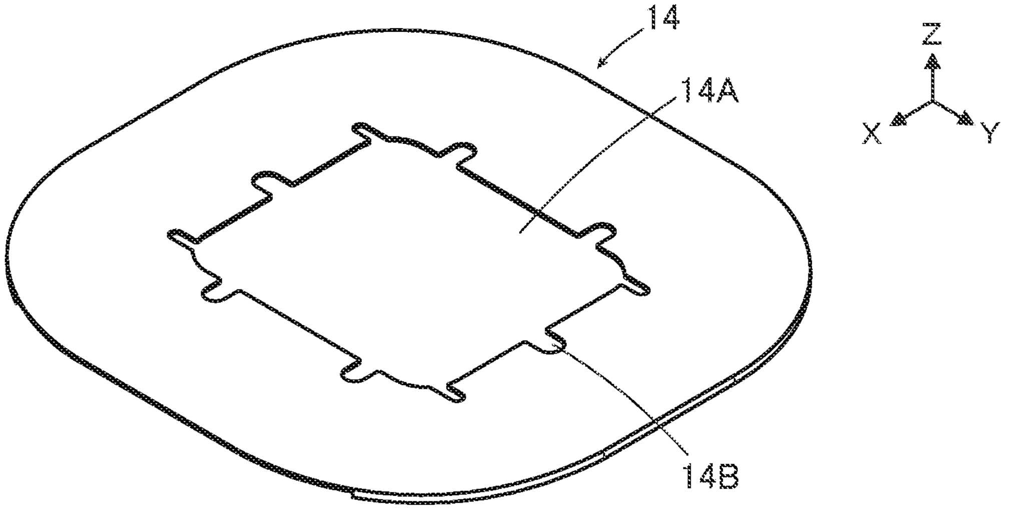
FIG. 12 is a perspective view showing a reinforcement sheet used in the connector of Embodiment 1.

As shown in FIG. 12, the reinforcement sheet 14 is provided to reinforce a mounting object (not shown) such as a garment on which the connector 11 is to be mounted. The reinforcement sheet 14 is made of an insulating material and provided at its center with an opening 14A. Further, a plurality of notches 14B corresponding to the bosses 16C of the top insulator 16 are formed along the periphery of the opening 14A of the reinforcement sheet 14.

The four contact through-holes 16B of the top insulator 16, the four plug contacts 13, the four contact arrangement regions 15A of the sheet type conductive member 15, and the four inner contacts 18 of the bottom insulator 17 are arranged to align with one another in the Z direction.

The bosses 16C of the top insulator 16, the notches 14B of the reinforcement sheet 14, the through-holes 15G of the sheet type conductive member 15, and the through-holes 17C of the bottom insulator 17 are arranged to align with one another in the Z direction.

When the connector 11 is assembled, first, the bosses 16C of the top insulator 16 are inserted into the notches 14B of the reinforcement sheet 14. At this time, the four contact through-holes 16B of the top insulator 16 are situated inside the opening 14A of the reinforcement sheet 14.

Subsequently, the tubular portions 13A of the plug contacts 13 are inserted into the four contact through-holes 16B of the top insulator 16 correspondingly from the −Z direction, and the bottom insulator 17 is pressed against the top insulator 16 in the +Z direction with the sheet type conductive member 15 being sandwiched therebetween.

At this time, the flange 13B of each plug contact 13 is situated above the corresponding contact arrangement region 15A of the sheet type conductive member 15, and each inner contact 18 formed on the bottom insulator 17 is inserted into the recessed portion 13C of the corresponding plug contact 13 while pushing the corresponding contact arrangement region 15A of the sheet type conductive member 15.

Since the cross-shaped cuts 15D are formed separately in the four contact arrangement regions 15A of the sheet type conductive member 15, the four inner contacts 18 are each inserted into the recessed portion 13C of the corresponding plug contact 13 while opening the cut 15D of the corresponding contact arrangement region 15A.

Figure 13:
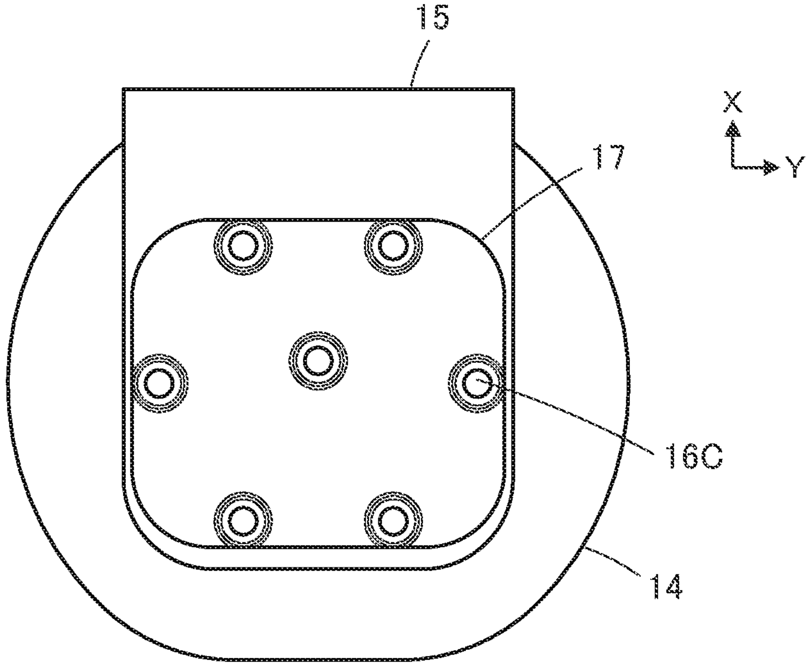
FIG. 13 is a bottom view showing the connector of Embodiment 1.

When the bottom insulator 17 is pressed against the top insulator 16, the bosses 16C of the top insulator 16 sequentially pass through the notches 14B of the reinforcement sheet 14, the through-holes 15G of the sheet type conductive member 15, and the through-holes 17C of the bottom insulator 17. Then, the ends of the bosses 16C projecting on the −Z directional side of the bottom insulator 17 are heated and deformed as shown in FIG. 13, whereby the top insulator 16 and the bottom insulator 17 are fixed to each other. Thus, the assembling operation of the connector 11 is completed.

Note that the plug contacts 13 are fixed to the top insulator 16 and the bottom insulator 17 because their flanges 13B are sandwiched between the top insulator 16 and the bottom insulator 17.

The four second protrusion portions 18C of the inner contact 18 each protrude in a direction inclined 45 degrees with respect to the X direction and the Y direction in an XY plane as shown in FIG. 7, and the four cuts 15D of the sheet type conductive member 15 are each arranged such that the lines of the cross extend in the X direction and the Y direction as shown in FIGS. 10 and 11.

Figure 14:
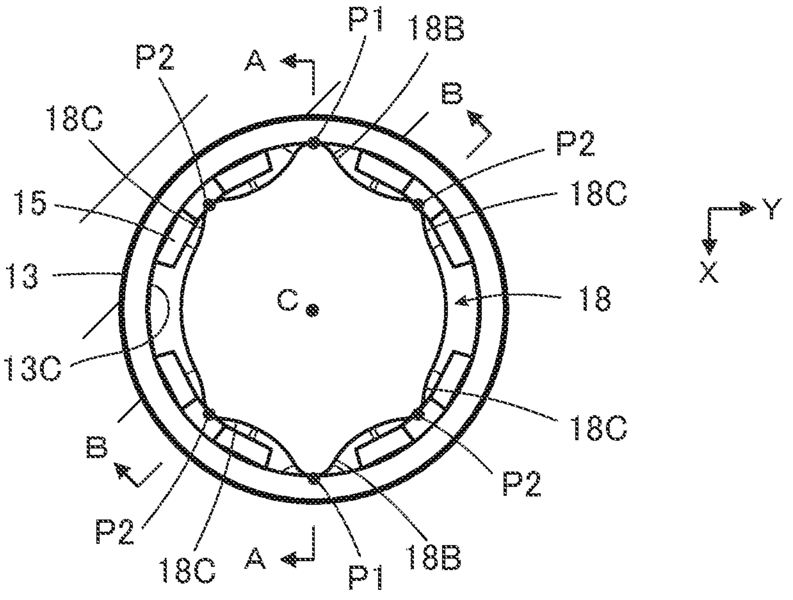
FIG. 14 is a cross-sectional plan view showing the state of the interior of the plug contact in the connector of Embodiment 1 connected to the connection object.

Accordingly, when the inner contact 18 of the bottom insulator 17 is inserted into the recessed portion 13C of the corresponding plug contact 13 while opening the cut 15D of the corresponding contact arrangement region 15A of the sheet type conductive member 15, parts of the sheet type conductive member 15 adjacent to the cross-shaped cut 15D are pushed into the recessed portion 13C of the plug contact 13 by the inner contact 18 and sandwiched between the pressing portions P2 formed at the tips of the four second protrusion portions 18C of the inner contact 18 and the inner surface of the recessed portion 13C of the plug contact 13 as shown in FIG. 14.

Meanwhile, the two first protrusion portions 18B of the inner contact 18 are to be situated inside the opened cut 15D of the sheet type conductive member 15 when the inner contact 18 is inserted in the recessed portion 13C of the plug contact 13 because the first protrusion portions 18B protrude separately in the +X direction and the −X direction in an XY plane. Accordingly, the contacting portions P1 formed at the tips of the two first protrusion portions 18B of the inner contact 18 directly face the inner surface of the recessed portion 13C of the plug contact 13 as shown in FIG. 14.

Figure 15:
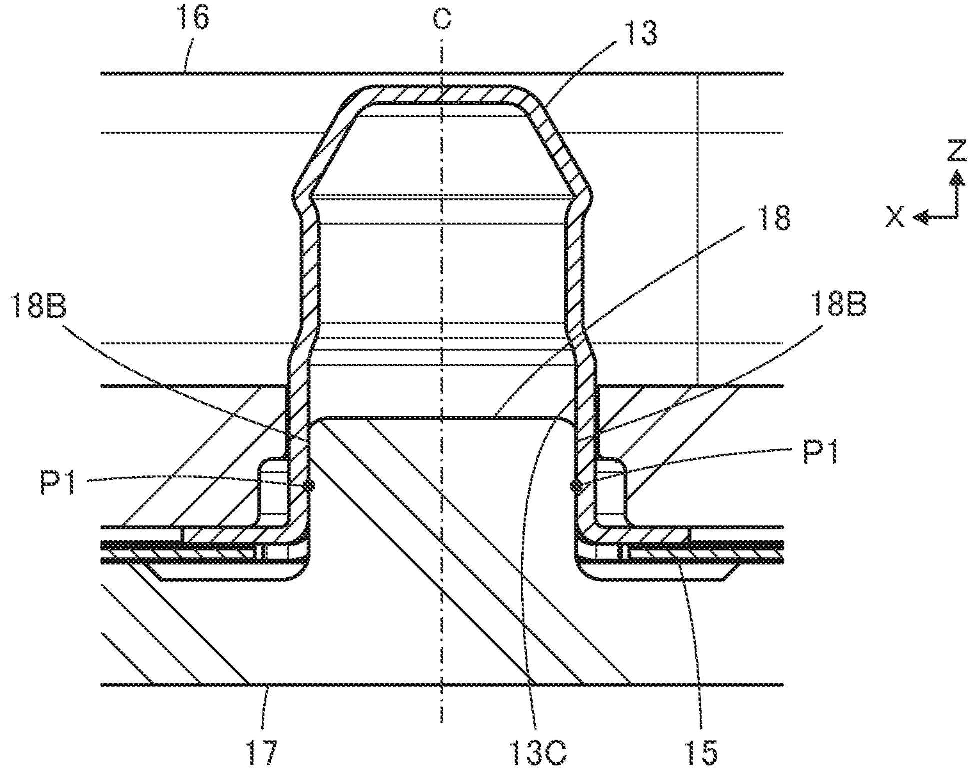
FIG. 15 is a cross-sectional view taken along line A-A in FIG. 14.

Since the first distance R1 from the fitting axis C of the inner contact 18 to the tip of each first protrusion portion 18B is set slightly larger than the radius of the recessed portion 13C of the plug contact 13, when the inner contact 18 is inserted in the recessed portion 13C of the plug contact 13, pushing forces of the tip of the first protrusion portion 18B of the inner contact 18 and the inner surface of the recessed portion 13C of the plug contact 13 act on each other. Consequently, at least one of the first protrusion portion 18B or the plug contact 13 deforms, and as shown in FIG. 15, the pair of contacting portions P1 formed at the tips of the two first protrusion portions 18B of the inner contact 18 are pressed against the inner surface of the recessed portion 13C of the plug contact 13, whereby the inner contact 18 is electrically connected to the plug contact 13.

Figure 16:
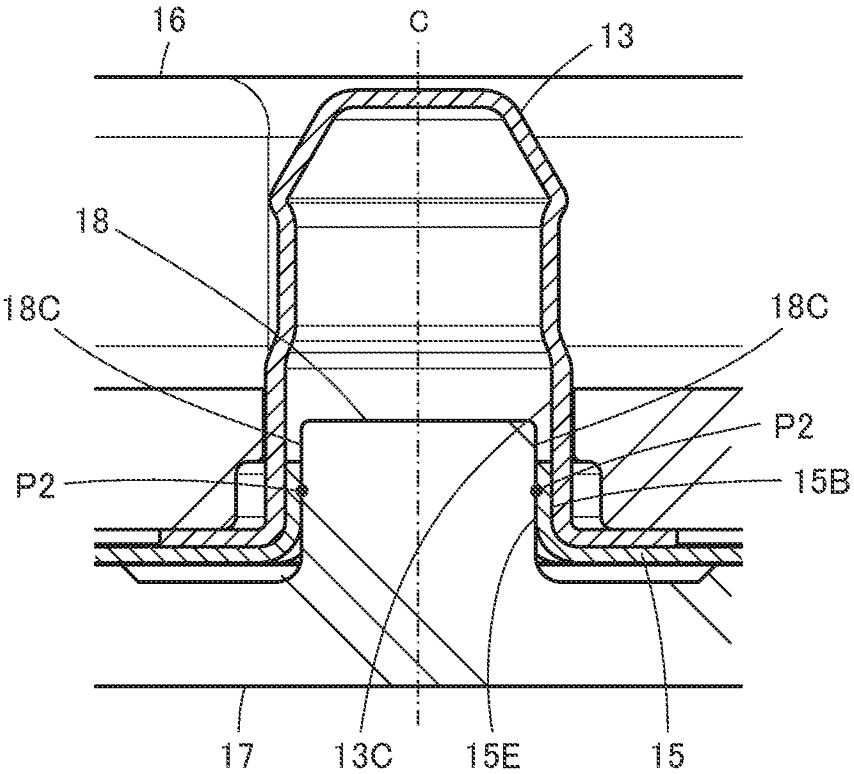
FIG. 16 is a cross-sectional view taken along line B-B in FIG. 14.

In addition, since the second distance R2 from the fitting axis C of the inner contact 18 to the tip of each second protrusion portion 18C is set slightly larger than the value obtained by subtracting the thickness of the sheet type conductive member 15 from the radius of the recessed portion 13C of the plug contact 13, when the inner contact 18 is inserted in the recessed portion 13C of the plug contact 13, pushing forces of the tip of the second protrusion portion 18C of the inner contact 18 and the inner surface of the recessed portion 13C of the plug contact 13 act on each other. Consequently, at least one of the second protrusion portion 18C, the sheet type conductive member 15, or the plug contact 13 deforms, and as shown in FIG. 16, the sheet type conductive member 15 sandwiched between the pressing portions P2 formed at the tips of the second protrusion portions 18C of the inner contact 18 and the inner surface of the recessed portion 13C of the plug contact 13 is pressed against the inner surface of the recessed portion 13C of the plug contact 13 by the pressing portions P2.

In the same manner, the sheet type conductive member 15 is pressed against the inner surface of the recessed portion 13C of the plug contact 13 by the four pressing portions P2 formed at the tips of the four second protrusion portions 18C of the inner contact 18.

In the meantime, as shown in FIGS. 10 and 11, the wiring layer 15B is exposed in the contact arrangement regions 15A on the top surface of the sheet type conductive member 15, and the wiring layer 15E is exposed in the positions corresponding to the contact arrangement regions 15A on the bottom surface of the sheet type conductive member 15.

Accordingly, the wiring layer 15B on the top surface of the sheet type conductive member 15 makes contact with the inner surface of the recessed portion 13C of the plug contact 13 at a predetermined contact pressure, while the wiring layer 15E on the bottom surface of the sheet type conductive member 15 makes contact with the pressing portions P2 of the inner contact 18 at a predetermined contact pressure.

Consequently, the wiring layer 15B exposed on the top surface of the sheet type conductive member 15 is electrically connected to the plug contact 13 directly, and the wiring layer 15E exposed on the bottom surface of the sheet type conductive member 15 is electrically connected to the plug contact 13 via the inner contact 18. In other words, both the wiring layers 15B and 15E are connected the plug contact 13.

Thus, with the connector 11, both the wiring layer 15B formed of a flexible conductor disposed on the top surface side of the sheet type conductive member 15 and the wiring layer 15E formed of a flexible conductor disposed on the bottom surface side of the same can be electrically connected to one plug contact 13 by use of the inner contact 18.

Therefore, when the connector 11 is connected to a sheet type conductive member having a flexible conductor exposed only on the top surface side, the plug contact 13 can be electrically connected to the flexible conductor on the top surface side of the sheet type conductive member, and when the connector 11 is connected to a sheet type conductive member having a flexible conductor exposed only on the bottom surface side, the plug contact 13 can be electrically connected to the flexible conductor on the bottom surface side of the sheet type conductive member.

Further, when the connector 11 is connected to a sheet type conductive member having flexible conductors exposed on both the top and bottom surface sides like the sheet type conductive member 15 in Embodiment 1, the plug contact 13 can be electrically connected to both the flexible conductor on the top surface side and the flexible conductor on the bottom surface side of the sheet type conductive member. For instance, in the case of using, as the connection object, a sheet type conductive member having a multilayer structure in which flexible conductors each constituting a shielding layer are exposed separately on the top and bottom surface sides and another flexible conductor constituting a signal wiring layer is disposed between those shielding layers while being insulated from both of the shielding layers, when the plug contact 13 connected to the shielding layers on the top and bottom surface sides is connected to a ground potential, a shielding effect with respect to the signal wiring layer is demonstrated, and highly accurate signal transmission can be carried out with the influence of disturbance caused by electromagnetic waves and the like being minimized.

While the reinforcement sheet 14 is disposed between the bottom insulator 17 and the top insulator 16 in the connector 11 of Embodiment 1, the reinforcement sheet 14 may be omitted when it is not necessary to reinforce the mounting object such as a garment on which the connector 11 is to be mounted.

Embodiment 2

While the inner contact 18 used in the connector 11 of Embodiment 1 has the two first protrusion portions 18B and the four second protrusion portions 18C, the invention is not limited thereto.

Figure 17:
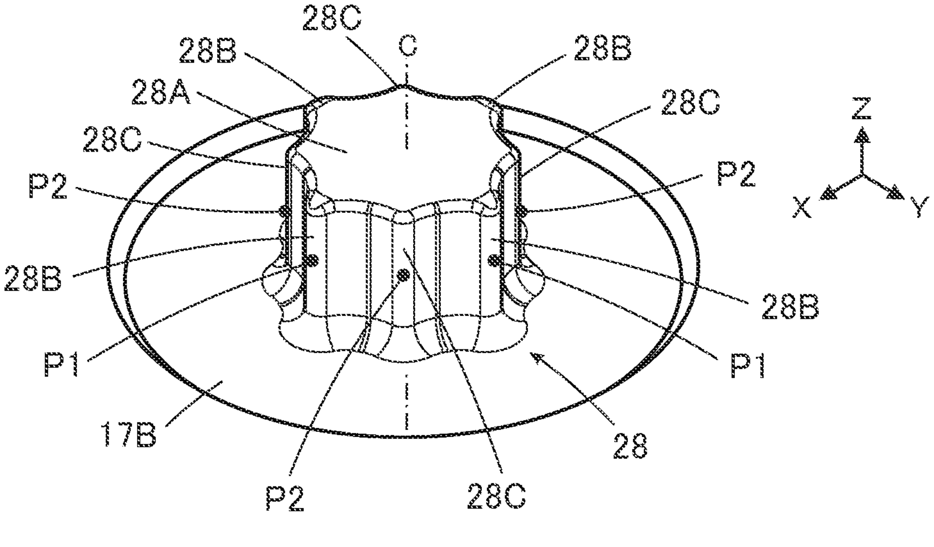
FIG. 17 is a perspective view showing an inner contact in Embodiment 2.
Figure 18:
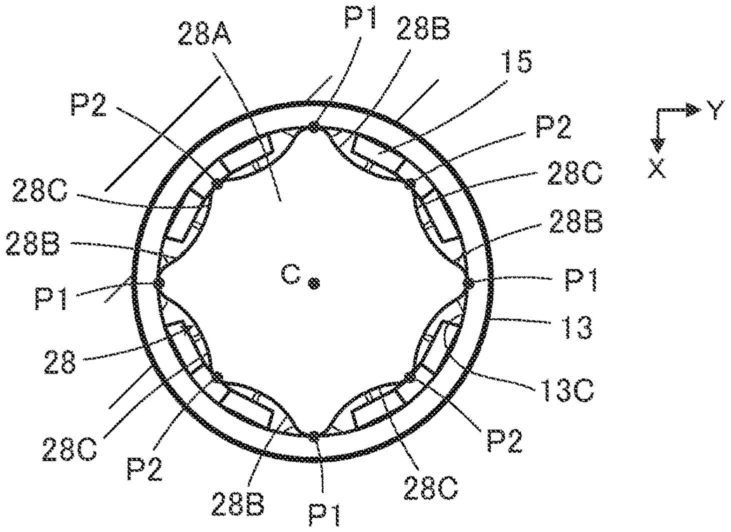
FIG. 18 is a cross-sectional plan view showing the state of the interior of a plug contact in a connector of Embodiment 2 connected to a connection object.

FIGS. 17 and 18 show an inner contact 28 used in a connector according to Embodiment 2. This inner contact 28 includes four first protrusion portions 28B and four second protrusion portions 28C that are arranged on the lateral side of a projection 28A projecting in the +Z direction along the fitting axis C.

The four first protrusion portions 28B are arranged at 90-degree intervals about the fitting axis C in an XY plane.

The four second protrusion portions 28C are also arranged at 90-degree intervals about the fitting axis C in an XY plane but are situated in rotational positions that are 45 degrees off from the four first protrusion portions 28B about the fitting axis C. That is, each second protrusion portion 28C is spaced from an adjacent first protrusion portion 28B at a 45-degree interval about the fitting axis C.

As with the inner contact 18 in Embodiment 1, an outer peripheral surface of the projection 28A is entirely covered with a conductive layer, the conductive layer covering the tips of the four first protrusion portions 28B forms four contacting portions P1, and the conductive layer covering the tips of the four second protrusion portions 28C forms four pressing portions P2.

In an XY plane, a distance from the fitting axis C to the tip of each first protrusion portion 28B and a distance from the fitting axis C to the tip of each second protrusion portion 28C are the same as the first distance R1 from the fitting axis C to the tip of each first protrusion portion 18B and the second distance R2 from the fitting axis C to the tip of each second protrusion portion 18C in the inner contact 18 shown in FIG. 7, respectively.

When the inner contact 28 thus configured is inserted into the recessed portion 13C of the plug contact 13 while pushing the sheet type conductive member 15, the four contacting portions P1 are pressed against the inner surface of the recessed portion 13C of the plug contact 13 so that the inner contact 28 is electrically connected to the plug contact 13, and the sheet type conductive member 15 pushed in the recessed portion 13C is pressed against the inner surface of the recessed portion 13C of the plug contact 13 by the four pressing portions P2 of the inner contact 28.

Thus, likewise, both the wiring layer 15B disposed on the top surface side of the sheet type conductive member 15 and the wiring layer 15E disposed on the bottom surface side of the same can be electrically connected to the plug contact 13 even when the inner contact 18 is replaced by the inner contact 28 shown in FIGS. 17 and 18 in the connector 11 according to Embodiment 1.

Embodiment 3

Figure 19:
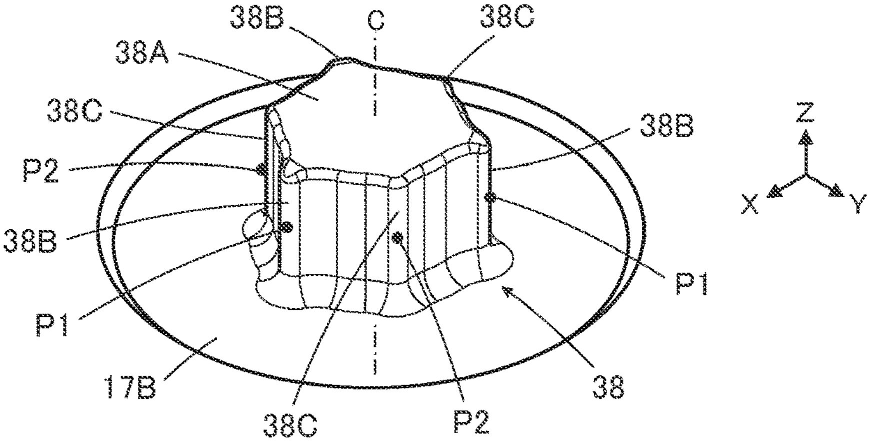
FIG. 19 is a perspective view showing an inner contact in Embodiment 3.
Figure 20:
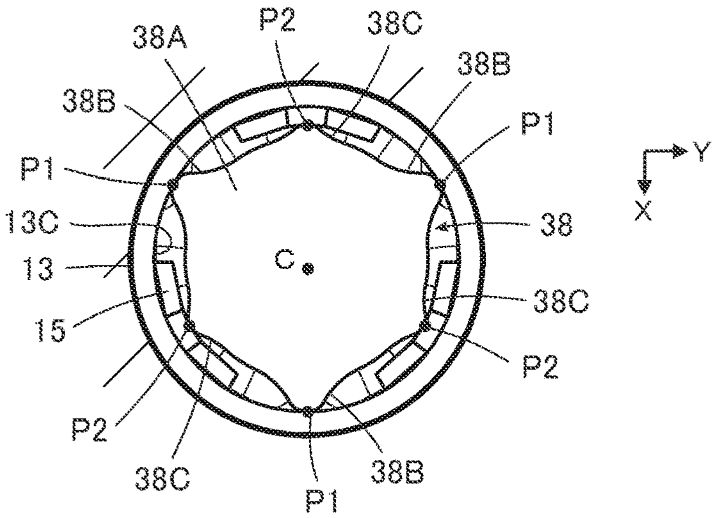
FIG. 20 is a cross-sectional plan view showing the state of the interior of a plug contact in a connector of Embodiment 3 connected to a connection object.
Figure 21:
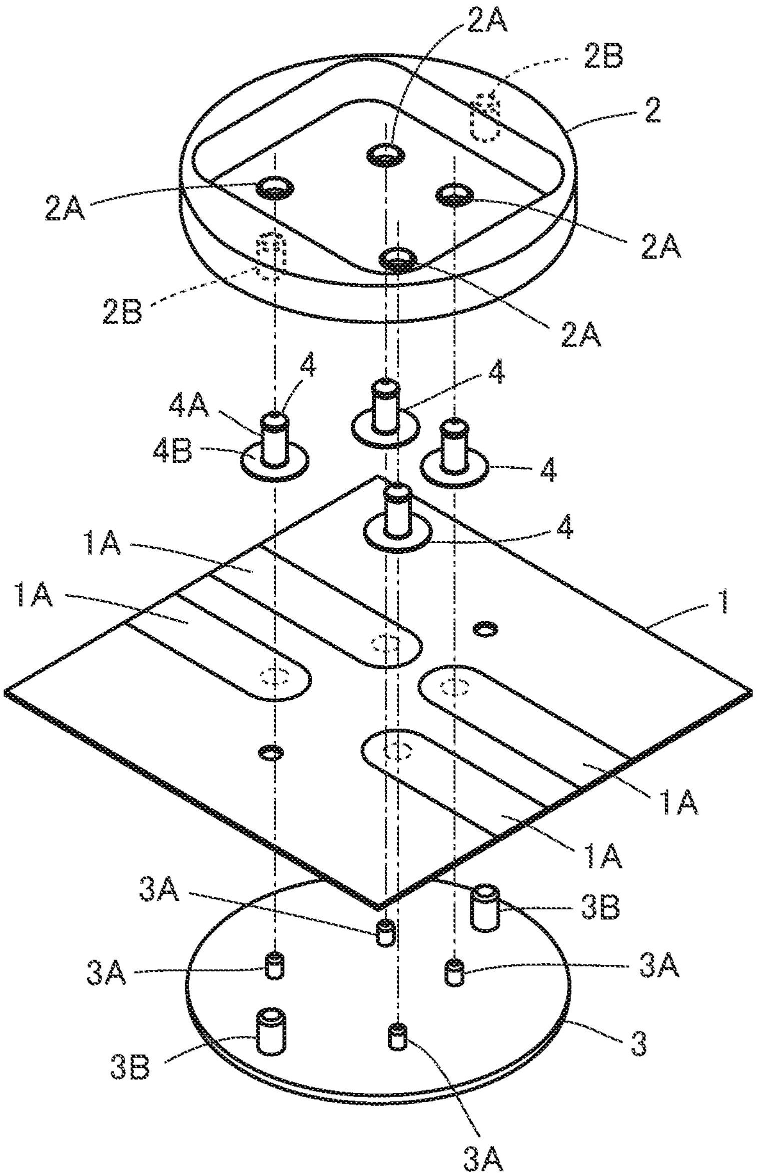
FIG. 21 PRIOR ART
FIG. 21 is an exploded perspective view of a conventional connector.
Figure 22:
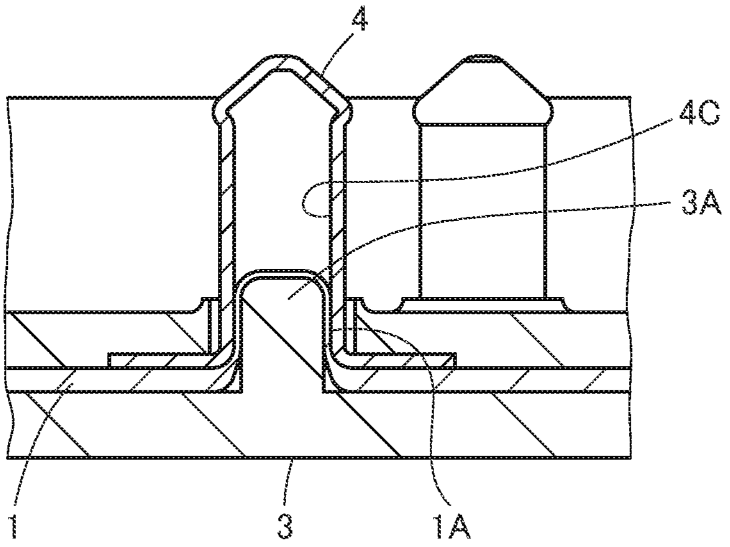
FIG. 22 PRIOR ART
FIG. 22 is a partial cross-sectional view showing the conventional connector.

FIGS. 19 and 20 show an inner contact 38 used in a connector according to Embodiment 3. This inner contact 38 includes three first protrusion portions 38B and three second protrusion portions 38C that are arranged on the lateral side of a projection 38A projecting in the +Z direction along the fitting axis C.

The three first protrusion portions 38B are arranged at 120-degree intervals about the fitting axis C in an XY plane.

The three second protrusion portions 38C are also arranged at 120-degree intervals about the fitting axis C in an XY plane but are situated in rotational positions that are 60 degrees off from the three first protrusion portions 38B about the fitting axis C. That is, each second protrusion portion 38C is spaced from an adjacent first protrusion portion 38B at a 60-degree interval about the fitting axis C.

As with the inner contact 18 in Embodiment 1, an outer peripheral surface of the projection 38A is entirely covered with a conductive layer, the conductive layer covering the tips of the three first protrusion portions 38B forms three contacting portions P1, and the conductive layer covering the tips of the three second protrusion portions 38C forms three pressing portions P2.

In an XY plane, a distance from the fitting axis C to the tip of each first protrusion portion 38B and a distance from the fitting axis C to the tip of each second protrusion portion 38C are the same as the first distance R1 from the fitting axis C to the tip of each first protrusion portion 18B and the second distance R2 from the fitting axis C to the tip of each second protrusion portion 18C in the inner contact 18 shown in FIG. 7, respectively.

While the sheet type conductive member 15 shown in FIGS. 10 and 11 has a cross-shaped cut 15D in each contact arrangement region 15A, for the inner contact 38 in Embodiment 3, it is preferable to use a sheet type conductive member with a Y-shaped cut having three cut lines extending from the center of the contact arrangement region 15A at 120-degree intervals, instead of the cross-shaped cut 15D. Furthermore, preferably, the orientations of the inner contact 38 and the corresponding Y-shaped cut are adjusted such that the three first protrusion portions 38B of the inner contact 38 overlap the three cut lines of the Y-shaped cut.

With this configuration, when the inner contact 38 is inserted into the recessed portion 13C of the plug contact 13 while opening the Y-shaped cut of the sheet type conductive member 15, the three contacting portions P1 formed at the tips of the three first protrusion portions 38B of the inner contact 38 are situated inside the opened cut and make contact with the inner surface of the recessed portion 13C of the plug contact 13, and parts of the sheet type conductive member 15 adjacent to the cut are sandwiched between the three pressing portions P2 formed at the tips of the three second protrusion portions 38C of the inner contact 38 and the inner surface of the recessed portion 13C of the plug contact 13.

Accordingly, the inner contact 38 is electrically connected to the plug contact 13, and the sheet type conductive member 15 pushed in the recessed portion 13C is pressed against the inner surface of the recessed portion 13C of the plug contact 13 by the three pressing portions P2 of the inner contact 38.

Thus, likewise, both the wiring layer 15B disposed on the top surface side of the sheet type conductive member 15 and the wiring layer 15E disposed on the bottom surface side of the same can be electrically connected to the plug contact 13 even when the inner contact 18 is replaced by the inner contact 38 shown in FIGS. 19 and 20 in the connector 11 according to Embodiment 1.

In Embodiments 1 to 3 above, the plug contacts 13 disposed in the contact arrangement regions 15A of the sheet type conductive member 15 each make contact with both the wiring layer 15B exposed on the top surface side of the sheet type conductive member 15 and the wiring layer 15E exposed on the bottom surface side of the sheet type conductive member 15; however, for instance, it is also possible to connect only the wiring layer 15E exposed on the bottom surface side of the sheet type conductive member 15 to the plug contacts 13 disposed in the contact arrangement regions 15A.

While the sheet type conductive member 15 used in Embodiments 1 to 3 above has a multilayer structure, the invention is not limited thereto, and it is sufficient that a conductive member has a flexible conductor exposed on at least one surface of the conductive member.

While the two layers of flexible conductors, namely, the wiring layer 15B and the wiring layer 15E, of the sheet type conductive member 15 are connected to one plug contact 13 in Embodiments 1 to 3 above, the invention is not limited thereto, and three or more layers of flexible conductors can be connected to one plug contact 13.

While the connector 11 according to Embodiments 1 to 3 above has four plug contacts 13, the number of the plug contacts 13 is not limited, and it is sufficient that there is provided at least one plug contact 13 electrically connected to a flexible conductor exposed on at least one surface of the sheet type conductive member 15.

What is claimed is:

1. A connector comprising:

a plug contact having a conductive property, having a tubular shape, and including a recessed portion extending along a fitting axis; and an inner contact constituted of a projection that is inserted in the recessed portion and has an outer peripheral surface entirely covered with a conductive layer, wherein the inner contact has contacting portions making contact with the plug contact within the recessed portion and pressing portions situated in a rotational position different from the contacting portions about the fitting axis, and a part of a connection object of sheet type having a flexible conductor exposed on at least one surface of the connection object is sandwiched between the pressing portions and an inner surface of the recessed portion in a direction perpendicular to the fitting axis, the inner surface of the recessed portion makes contact with a top surface of the connection object, and the pressing portions make contact with a bottom surface of the connection object, whereby the plug contact is electrically connected to the flexible conductor directly when the flexible conductor is exposed on the top surface of the connection object, and the plug contact is electrically connected to the flexible conductor via the inner contact when the flexible conductor is exposed on the bottom surface of the connection object, wherein the projection includes:

two first protrusion portions arranged on opposite sides across the fitting axis, the two first protrusion portions protruding in directions perpendicular to the fitting axis; and four second protrusion portions disposed at 90-degree intervals about the fitting axis and each spaced from an adjacent one of the two first protrusion portions at a 45-degree interval about the fitting axis, the four second protrusion portions protruding in directions perpendicular to the fitting axis, the conductive layer covering a tip of each of the two first protrusion portions forms each of the contacting portions, and the conductive layer covering a tip of each of the four second protrusion portions forms each of the pressing portions.

2. The connector according to claim 1, wherein a first distance from the fitting axis to each of the contacting portions is larger than a second distance from the fitting axis to each of the pressing portions in a direction perpendicular to the fitting axis.

3. The connector according to claim 2, wherein the first distance is slightly larger than a radius of the recessed portion, and the second distance is slightly larger than a value obtained by subtracting a thickness of the connection object from the radius of the recessed portion.

4. The connector according to claim 1, wherein the plug contact includes a tubular portion and a flange formed at one end of the tubular portion, and the recessed portion is formed from an interior of the tubular portion.

5. The connector according to claim 4, comprising a housing having an insulating property and configured to retain the connection object and the plug contact, wherein the housing includes:

a top insulator provided with a contact through-hole through which the tubular portion of the plug contact passes and which is smaller than the flange; and a bottom insulator provided with the inner contact, and the top insulator is fixed to the bottom insulator such that the tubular portion of the plug contact passes through the contact through-hole and the connection object and the flange are sandwiched between the top insulator and the bottom insulator.

6. A connector comprising:

a plug contact having a conductive property, having a tubular shape, and including a recessed portion extending along a fitting axis; and an inner contact constituted of a projection that is inserted in the recessed portion and has an outer peripheral surface entirely covered with a conductive layer, wherein the inner contact has contacting portions making contact with the plug contact within the recessed portion and pressing portions situated in a rotational position different from the contacting portions about the fitting axis, and a part of a connection object of sheet type having a flexible conductor exposed on at least one surface of the connection object is sandwiched between the pressing portions and an inner surface of the recessed portion in a direction perpendicular to the fitting axis, the inner surface of the recessed portion makes contact with a top surface of the connection object, and the pressing portions make contact with a bottom surface of the connection object, whereby the plug contact is electrically connected to the flexible conductor directly when the flexible conductor is exposed on the top surface of the connection object, and the plug contact is electrically connected to the flexible conductor via the inner contact when the flexible conductor is exposed on the bottom surface of the connection object, wherein the projection includes:

four first protrusion portions disposed at 90-degree intervals about the fitting axis, the four first protrusion portions protruding in directions perpendicular to the fitting axis; and four second protrusion portions disposed at 90-degree intervals about the fitting axis and each spaced from an adjacent one of the four first protrusion portions at a 45-degree interval about the fitting axis, the four second protrusion portions protruding in directions perpendicular to the fitting axis, the conductive layer covering a tip of each of the four first protrusion portions forms each of the contacting portions, and the conductive layer covering a tip of each of the four second protrusion portions forms each of the pressing portions.

7. A connector comprising:

a plug contact having a conductive property, having a tubular shape, and including a recessed portion extending along a fitting axis; and an inner contact constituted of a projection that is inserted in the recessed portion and has an outer peripheral surface entirely covered with a conductive layer, wherein the inner contact has contacting portions making contact with the plug contact within the recessed portion and pressing portions situated in a rotational position different from the contacting portions about the fitting axis, and a part of a connection object of sheet type having a flexible conductor exposed on at least one surface of the connection object is sandwiched between the pressing portions and an inner surface of the recessed portion in a direction perpendicular to the fitting axis, the inner surface of the recessed portion makes contact with a top surface of the connection object, and the pressing portions make contact with a bottom surface of the connection object, whereby the plug contact is electrically connected to the flexible conductor directly when the flexible conductor is exposed on the top surface of the connection object, and the plug contact is electrically connected to the flexible conductor via the inner contact when the flexible conductor is exposed on the bottom surface of the connection object, wherein the projection includes:

three first protrusion portions disposed at 120-degree intervals about the fitting axis, the three first protrusion portions protruding in directions perpendicular to the fitting axis; and three second protrusion portions disposed at 120-degree intervals about the fitting axis and each spaced from an adjacent one of the three first protrusion portions at a 60-degree interval about the fitting axis, the three second protrusion portions protruding in directions perpendicular to the fitting axis, the conductive layer covering a tip of each of the three first protrusion portions forms each of the contacting portions, and the conductive layer covering a tip of each of the three second protrusion portions forms each of the pressing portions.

* * * * *